United States Patent [19]

Steiniger et al.

[11] Patent Number: 5,059,476
[45] Date of Patent: Oct. 22, 1991

[54] HINGED RIGID OR SEMIRIGID PRODUCT

[75] Inventors: John L. Steiniger, Westlake; Glen D. Schaaf; William S. Greenlee, both of Avon Lake; Elaine A. Mertzel, Rocky River, all of Ohio

[73] Assignee: The B. F. Goodrich Company, Brecksville, Ohio

[21] Appl. No.: 361,195

[22] Filed: Jun. 5, 1989

[51] Int. Cl.$^5$ .................. B32B 7/02; A47G 9/06; B29C 65/00

[52] U.S. Cl. .................. 428/217; 428/53; 428/54; 428/57; 428/58; 428/192; 428/424.6; 5/417; 156/304.3; 156/304.5; 156/298; 160/229.1

[58] Field of Search ............. 428/53, 54, 58, 60, 428/217, 57, 192, 424.6; 5/417; 156/304.3, 304.5, 243; 52/631; 160/229.1, 231.2

[56] References Cited

U.S. PATENT DOCUMENTS

| 4,387,128 | 6/1983 | Emms et al. | 428/60 |
| 4,448,625 | 5/1984 | Carrera | 456/243 |
| 4,476,174 | 10/1984 | Carrera | 428/58 |
| 4,654,245 | 3/1987 | Balzer et al. | 428/53 |
| 4,663,903 | 5/1987 | Ellingson | 428/58 |
| 4,766,020 | 8/1988 | Ellingson | 428/58 |
| 4,877,672 | 10/1989 | Shreiner | 428/217 |

OTHER PUBLICATIONS

Handbook of Thermoplastic Elastomers, 2nd Ed., M. Walker, pp. 201–203.
"Hytrel, A New Concept in Plastic Hinges Based on Dupont Hytrel® Polyester Elastomer", E85536.

Primary Examiner—Ellis P. Robinson
Assistant Examiner—Donald J. Loney
Attorney, Agent, or Firm—Laura F. Shunk; Daniel J. Hudak; Joe A. Powell

[57] ABSTRACT

A hinged flexible article is provided which has rigid or semirigid substrate means with an insert of a hinge material which permits repeated flexing of the article about the hinge without failure. The substrate means has a hardness of at least about 35 Shore D as measured by ASTM test D-2240, while the hinge material has a hardness of from about 25 to about 60 Shore D as measured by ASTM test D-2240.

18 Claims, 1 Drawing Sheet

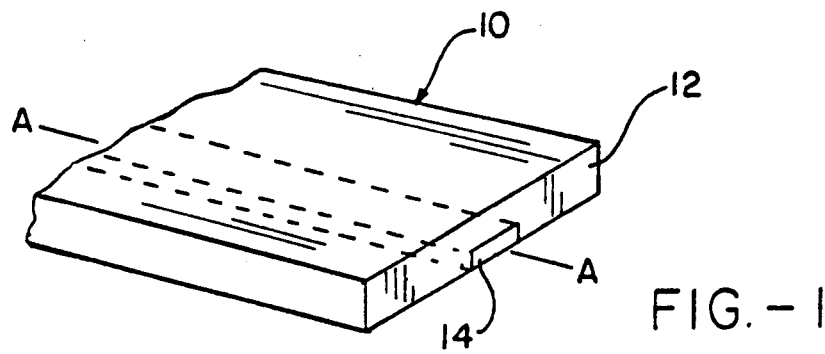
FIG.-1
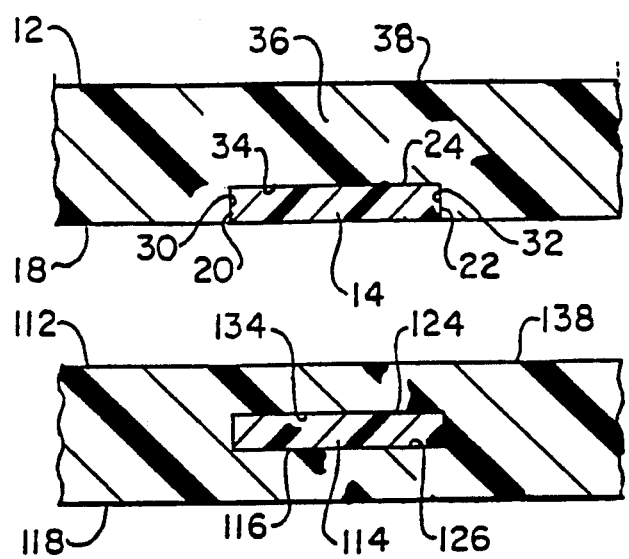
FIG.-2
FIG.-3
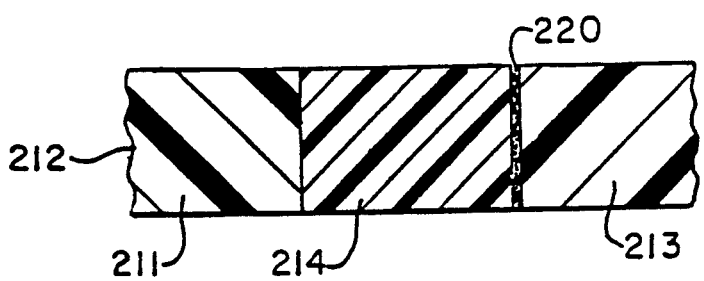
FIG.-4
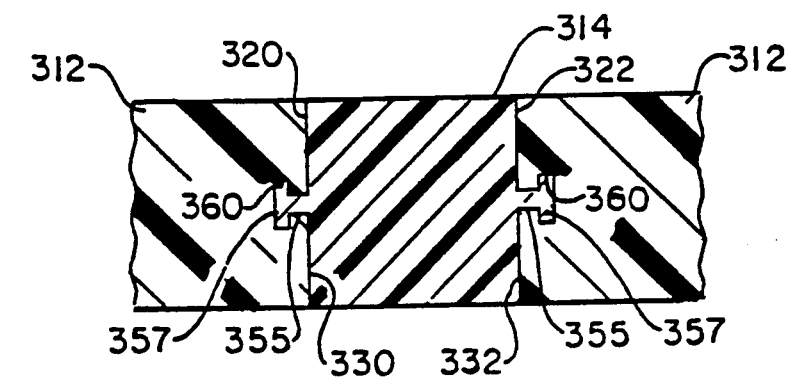
FIG.-5

HINGED RIGID OR SEMIRIGID PRODUCT

FIELD OF THE INVENTION

The invention relates to a rigid or semirigid product having a hinged member, and more specifically a rigid or semirigid product comprised of a substrate means having an intermediate hinge member which is more flexible than or which reinforces the substrate means.

BACKGROUND OF THE INVENTION

This invention relates generally to products having rigid or semirigid portions where it is an advantage to have such members foldable or flexible relative to each other. Examples of applications which might encompass such products include large mats which are advantageously folded for storage and/or for shipping. These mats include floor coverings and mats as might be used for chair mats or animal cage mats. Other applications include book hinges, window blinds, doors, housings, and generally any large flat rigid or semirigid object which could advantageously be flexed or folded, such as for shipping, storage, or in applications where living hinges are of use. In addition, flexible joints for rigid items such as conduit and pipe may be advantageous.

U.S. Pat. No. 4,476,174 to Carrera relates to a composite plastic chair mat having a flexible strip laminated into the underside of the mat, i.e., the floor engaging surface, and a transverse slit which overlays the flexible strip to allow the mat to be folded.

U.S. Pat. No. 4,448,625 to Carrera is a division of the above-cited reference and relates to the process by which the chair mat is made. The construction of this mat presents several disadvantages. The slit provides a gathering spot for dirt and a potential failure of the mat, especially under the long term application of pressure from office furniture. The slit could further be a safety hazard both at the slit face and at the mat edges where the user could trip over any unevenness which could arise. Moreover, the wear at the slit could present a poor appearance.

U.S. Pat. No. 4,387,128 to Emms et al also relates to a hinged foldable structure having a flexible hinge means.

SUMMARY OF THE INVENTION

The invention comprises a flexible or foldable article which is semirigid or rigid. In some instances this article may be substantially planar, or flat such as floor coverings, chair mats, stall liners, automobile mats and the like. The article has substrate means which is semirigid or rigid. The hinge means either has a flex fatigue resistance which is superior to that of the substrate means or the hinge means has a hardness lower than the hardness of the substrate means. In any case, the hinge acts either to reinforce an axis of bending or to lend flexibility to the article at the point of the hinge. The hinge means has a hardness of from about 25 to about 60 Shore D, and preferably from about 30 to 55 Shore D; and most preferably from about to about 40 to about 50 Shore D as measured by ASTM D-2240. The substrate means (which may be a single member or two different members) has a hardness of greater than 35 Shore D; and preferably from greater than 45 Shore D; and most preferably from about 50 to about 90 Shore D as measured by ASTM D-2240. The hinge permits repeated flexing or folding of the article without failure.

An advantage of the present invention is the provision of a large flat article which can be folded for shipping, storage, or movement.

Another advantage of the present invention is the provision of a longer lasting mat or floor covering. Further, it is of advantage that the mat or floor covering of the present invention eliminates a break in the top surface of the mat or floor covering where the break represents an area for dirt to gather or to be tripped over or to catch furniture.

A further advantage of the present invention is the provision of a hinge means for rigid or semirigid thermoplastic articles which will permit repeated flexing or folding without failure.

BRIEF DESCRIPTION OF THE DRAWINGS

FIG. 1 is a perspective of a first embodiment of a flexible article in accordance with the invention;

FIG. 2 is a cross-section of the first embodiment of a flexible article in accordance with the invention;

FIG. 3 is a cross-section of a second embodiment of a flexible article in accordance with the invention;

FIG. 4 is a cross section of a third embodiment of a flexible article in accordance with the invention; and FIG. 5 is a cross-section of a fourth embodiment of a flexible article in accordance with the invention.

DETAILED DESCRIPTION OF THE INVENTION

The invention relates generally to a rigid or semirigid article which includes hinge means to permit flexing or folding of said article along the hinge means. The hinge means allows folding to reduce the size for shipping and storage and for movement after the article has been used, or allows flexing to permit movement within the article. Similarly the hinge permits assembly of otherwise misaligned components.

FIG. 1 shows an article 10 made in accordance with the invention. It should be understood that the article is shown as a flat article, such as a mat, however, the hinge means of the invention is also applicable in other applications, such as for conduit. The article 10 includes substrate means 12 which is a semirigid or rigid material. The article 10 further includes a hinge means 14 which forms an integral portion of said article with the substrate means 12 and which provides for reinforcement and/or flexibility so that the article can be repeatedly flexed and/or folded about an axis A defined by a flexible section comprising the hinge means 14, or the hinge means 14 and the associated substrate means 12.

The hinge means 14 is comprised of an insert within the substrate means 12. Insert is meant herein in the broadest sense to encompass the several embodiments shown in FIGS. 2-5. Specifically, the insert may be adhered on three or four sides to the substrate means as is shown in FIGS. 2 and 3, respectively. Alternatively, the insert may act to join separate strips of substrate (which may even be different substrate materials) as is shown in FIGS. 4 and 5. As used herein, "adhering surface" or "adhering interface" is used broadly and encompasses mechanical adhesion or cooperation, such as by anchoring means as well as chemical adhesion. The section of article comprising the insert, or the insert and associated substrate forms a flexible section. The interior and exterior, or top and bottom surfaces, of this section are continuous and unbroken, meaning there is no slit which overlies the hinge means.

In FIG. 2, the hinge means 14 has a bottom surface which is substantially coplanar with a bottom surface 18 of the substrate means 12. The hinge means 14 has two substantially transverse adhering surfaces 20 and 22 which cooperates with and are adhered to two substantially transverse adhering surfaces 30 and 32 of the substrate means 12. The hinge means 14 further includes a top adhering surface 24 which cooperates with and is adhered to a bottom adhering surface 34 of the substrate means 12. The substrate means 12 has a top layer 36 which extends over the hinge means 14 so as to present a smooth and unbroken exposed surface 38. It is preferable that when the mat is used as a floor mat that the surface 38 is the top surface, i.e., the exposed surface, while the hinge means 14 cooperates with the floor. Of course, it should be understood that the hinge means may also be inserted into the top side of the article.

The embodiment shown in FIG. 3 shows the hinge means 114 as being fully incorporated within the substrate means 112 so that the hinge means 114 has top and bottom adhering surfaces 124 and 116 which cooperate with and adhere to bottom and top adhering surfaces 134 and 126, respectively of the substrate means 112.

In FIG. 4, the hinge member 214 forms a joint between and connects the substrate means 212 which is comprised of a first substrate member 211 and a second substrate member 213 which is illustrated as a different material than the first substrate member 211. Further, this embodiment is illustrated as including an optional adhesive layer 220 between the hinge means 214 and the second substrate member 213.

In FIG. 5, the hinge means 314 is shown as including mechanical anchoring means 321 which helps to secure the hinge means 314 to the substrate means 312. The anchoring means 321 extends along each of the transverse edges 320 and 322 of the hinge means 314 and each includes a flange 355 extending into a flared shoulder member 357 which interlocks with corresponding longitudinal receiving slots 360 in the adhering surface 330 and 332 of the substrate means 312.

While the term "surface" is used herein, it should be understood that the interfaces may fuse during processing and boundaries between the materials may be obscured. Thus, "surface" is meant broadly so as to include such cases.

The top and bottom surfaces of the finished article, can include additional layers such as might be used to give a finished appearance or to improve adhesion to a surface on which the article might be laid. Alternatively, the article might include bosses or cleats on one or both sides to improve friction.

The hinge is of a thickness (i.e., depth) of from about 0.001 to about 3 inches; preferably from about 0.010 to about 1.0 inch; and most preferably from about 0.015 to about 0.5 inch.

In a first embodiment, the hinge is thinner than the substrate. In this case the substrate has a thickness of from about 0.001 to about 3 inches; and preferably from about 0.012 to about 1.2 inches; and most preferably from about 0.018 to about 0.6 inches. In a second embodiment, the hinge extends the full thickness of the substrate, in which case the substrate has the same thicknesses as given for the hinge.

For most applications, the hinge has a width of less than 50 percent of the width of the article; and preferably of less than 40 percent; and most preferably 30 percent.

The dimensions of the substrates will depend on the particular application, but generally the invention is applicable, for example to mats or floor coverings, when the mats or floor coverings are too large to be easily transported in an automobile or to be carried by hand.

The hinge means either has a flex fatigue resistance which is superior to that of the substrate means, or the hinge means has a hardness lower than the hardness of the substrate means. In any case, the hinge acts either to reinforce an axis of bending or to lend flexibility to the article at the point of the hinge. The hinge means comprises a material which generally is softer than the substrate means, i.e. at least 5 units, preferably at least 10 units, and most preferably at least 20 units on the Shore D scale as measured by ASTM test D-2240. In the event the substrate means comprises first and second substrate members made of different materials, the hinge will be softer by the amount specified than the softer of the two substrate materials. The hinge means has a hardness of from about 25 to about 60 Shore D; preferably from about 30 to about 55 Shore D; and most preferably from about 40 to about 50 Shore D as measured by ASTM test No. D-2240.

The hinge means should also have good flex fatigue resistance, i.e., the hinge should go through maximum bending for at least 5 folds, preferably 7 folds, and most preferably 15 folds without significant failure. Failure may mean debonding of the hinge from the substrate or failure of the hinge or substrate material (i.e., either adhesive or cohesive failure such as the formation of cracks or microvoids or whitening of the material). The hinge should permit flexing. In most flat applications, i.e., mats and floor coverings, the hinge should permit folding through at least 90 degrees, preferably at least 120 degrees, and most preferably at least 150 degrees. Moreover, in such applications, it is often desirable that the article fold back on itself to minimize space requirements for transportation and storage.

Suitable hinge materials include polyurethanes; flexible polyvinyl chloride; thermoplastic elastomers based on polyesters, such as Lomod sold by General Electric, Inc.; polyolefin/elastomer blends, such as Santoprene sold by Monsanto, Inc., and Telcar sold by Teknor Apex, Inc.; styrene-butadiene copolymers such as Kraton sold by The Shell Chemical Company; ethylene copolymers; ionomers; polysiloxanes; and polymers based on dienes containing 4 to 18 carbon atoms and derivatives thereof. The compositions can be copolymers, blends, and filled and plasticized compositions based on the foregoing. The preferred hinge composition is polyurethane, and in particular polyurethane made from polyester polyol. An example of such polyurethanes are Estane 58206 and Estane 58271 sold by The BFGoodrich Company.

In the event that an adhesive is used to bind the substrate means to the hinge material, ethylene vinyl acetate is usually suitable, even to bind polar to non-polar compositions. Other adhesives include but are not limited to: polyurethanes, and olefins copolymerized with polar materials.

The substrate means is a rigid or semirigid material and may be comprised of one or more materials. The substrate means is a rigid or semirigid material which is capable of being adhered to the selected hinge material. Such substrates could be polymers, metals or cellulosic products. Preferred substrates include synthetic polymers and specifically thermoplastics. The most preferred substrate means is polyvinyl chloride and copolymers thereof, and in particular rigid and semirigid polyvinyl chlorides, i.e., polyvinyl chloride having a hardness of from about 50 to about 100 Shore D as measured by ASTM test D-2240. The substrates can also be copolymers, blends, and filled and plasticized compositions based on polyvinyl chloride. These compositions, as well as the hinge compositions, can include other additives as are known in the art such as pigments, antioxidants, lubricants, UV screeners, stabilizers, impact modifiers, smoke suppressants, processing aids, anti-static agents, and the like.

Various techniques can be used for bonding the hinge means to the substrates, such as coextrusion techniques wherein the hinge and substrate are essentially extruded at the same time and then formed into the final article. Other joining techniques which can be used include heat welding, dielectric sealing, laminating, thermoforming, mechanical means, adhesives, or compression molding.

EXAMPLE 1

A polyvinyl chloride (PVC) based compound having a Shore D hardness of 76 was prepared using approximately 16 phr of di-2-ethylhexyl phthalate plasticizer plus conventional levels of other additives. This compound was coextruded with a polyurethane produced from a polyester polyol (Estane 58206 produced by The BFGoodrich Company). The coextrusion was done using two single screw extruders which fed into a single six-inch wide sheet die. This coextrusion produced an approximately 5½ inch width of the strip with each layer being approximately 50 percent of the total thickness, which was from 0.05 to 0.06 inch. The extrudates were well-bonded and could not be separated by hand. This sample had a higher peel strength than the other two examples.

The coextruded sample was further tested as to flexibility as well as flex recovery. By "flex recovery" it is meant the ability of the sample to fully recover a planar configuration after being bent for an extended period without evidence of permanent distortion or degradation of the hinge. A flat sample of approximately 5½ inches × 6 inches × 0.050–0.060 inch was prepared as stated above. This sample was bent through an angle of at least 150 degrees and left overnight. The sample was subsequently flattened by pressing it back into the planar shape. No problems such as delamination, discoloration, opacity or permanent creasing or folding were evident.

EXAMPLE 2

Plaques of the PVC compound and polyurethane of Example 1 measuring 6 inches × 6 inches × 0.075 inches were prepared using compression molding. These plaques were coated with a thickness of 0.002 inch of an adhesive (A-1404 B produced by The BFGoodrich Company). The two plaques were then placed together. One set of plaques was allowed to dry overnight with no pressure applied while another set of plaques was allowed to dry overnight with a ten pound weight on it.

Following the drying period, the adhesion between the two plaques was measured using a 180° C. peel test at two inches per minute (ASTM D-2141). The sample with no pressure applied had a peel strength of 33 pounds whereas the sample with the weight applied had a peel strength of 30 pounds.

This data indicates that an excellent bond can be obtained between the PVC compound and the polyurethane regardless of whether pressure is applied to the substrate being bonded.

EXAMPLE 3

Compression molded plaques of approximately 6 inches × 6 inches × 0.075 inches of the PVC compound and the polyurethane used in Example 1 were prepared. Two plaques of each material were then placed together and subjected to a compression force of 40,000 pounds for one minute using three different temperatures (300°, 325° and 350° F.). Following the compression procedure, the samples were tested using a 180 degree peel test at two inches per minute (ASTM D-2141). The samples had peel strengths of 11, 31 and 55 pounds for 300°, 325°, and 350° F. pressings, respectively.

This data demonstrates that products with excellent adhesion can be produced by press laminating together a PVC compound with a polyurethane. Also, the best adhesion is produced at the highest molding temperature.

While in accordance with the Patent Statutes, the best mode and preferred embodiment has been set forth, the scope of the invention is not limited thereto, but rather by the scope of the attached claims.

What is claimed is:

1. An article having a smooth planar flexible section, said article comprising:
   rigid or semirigid substrate means having a hardness of greater than about 35 Shore D as measured by ASTM test D-2240, said substrate means including at least one substrate adhering interface,
   hinge means having a hardness of from about 25 to about 60 Shore D as measured by ASTM test D-2240 and said hinge means either being softer than said substrate means as measured by ASTM test D-2240 or having a greater flex fatigue resistance said hinge means including at least one hinge means adhering interface and said hinge means adhering interface adhering with said substrate means adhering interface to form said flexible section, said flexible section having a first exterior surface and a second exterior surface, said first and said second exterior surfaces both being substantially coplanar, continuous and unbroken, whereby said article is capable of repeated distortion through at least 90° within said flexible section without failure.

2. A flexible article as set forth in claim 1 wherein said flexible section can be flexed at least five distortions without failure.

3. A flexible article as set forth in claim 2, wherein said flexible section can be flexed through at least seven distortions without failure.

4. A flexible article as set for in claim 3, wherein said flexible section can be flexed through at least fifteen distortions without failure.

5. A flexible article as set forth in claim 4, wherein said hinge means has a hardness at least five Shore D units lower than the hardness of said substrate means.

6. A flexible article as set forth in claim 5, wherein said hinge means has a hardness at least 10 Shore D units lower than the hardness of said first substrate means.

7. A flexible article as set forth in claim 6, wherein said substrate means has a harness of greater than about 45 D and said hinge means has a hardness at least 20

Shore D units lower than the hardness of said substrate means.

8. A flexible article as set forth in claim 7, wherein said hinge means permits folding at said flexible section through at least 120 degrees.

9. A flexible article as set forth in claim 8, wherein said hinge means permits folding at said flexible section through at least 150 degrees.

10. A flexible article as set forth in claim 1 wherein said hinge means is comprised of one or more materials selected from the group consisting of polyurethanes, flexible polyvinyl chlorides, thermoplastic elastomers based on polyesters, polyolefin/elastomeric blends, styrene-butadiene copolymers, ethylene copolymers, ionomers, polysiloxanes, and polymers based on conjugated dienes containing 4 to 18 carbon atoms and derivatives thereof; and said substrate means are comprised of a synthetic polymer.

11. A flexible article as set forth in claim 1, wherein said hinge means has a hardness of from about 30 to about 55 Shore D and the substrate means has a hardness of greater than about 45 Shore D.

12. A flexible article as set forth in claim 11, wherein said hinge means has a hardness of from about 40 to about 50 Shore D substrate means has a hardness of greater than about 50 Shore D.

13. A flexible article as set forth in claim 12, wherein said hinge means comprises polyurethane and said substrate means comprises polyvinyl chloride.

14. A flexible article as set forth in claim 13, wherein said hinge means comprises a polyurethane made from a polyester polyol.

15. A flexible article as set forth in claim 14, wherein each of said hinge adhering interface includes a longitudinally extending male anchor means and said substrate adhering interfaces include longitudinally extending female seating means which cooperate with said male anchor means.

16. A flexible article as set forth in claim 14, wherein said hinge means are adhered to said substrate means at least by pressing said hinge means and substrate means together where one of the components is in a semi-molten state.

17. A foldable article having a smooth, planar flexible section, said article comprising:

rigid or semirigid thermoplastic substrate means comprises of a polyvinyl chloride or a copolymer or blend or plasticized composition which is at least 50 percent polyvinyl chloride by weight and having a hardness as measured by ASTM test D-2240 of greater than about 60 Shore D, said substrate means including at least one substrate adhering interface;

hinge means comprised of a polyurethane having a hardness as measured by ASTM test D-2240 of from about 40 to about 50 Shore D, said hinge means being at least 20 Shore D hardness units softer than said substrate means, said hinge means including at least one hinge means adhering interface and said hinge means adhering interface adhering directly with said substrate means adhering interface to form said flexible section, said flexible section having a first exterior surface and a second exterior surface, said first and second exterior surfaces both being substantially coplanar, continuous and unbroken and whereby said article is capable of being bent back on itself along said flexible section at least fifteen times without failure.

18. A foldable article as set forth in claim 17, wherein said article is a chair mat.

* * * * *